United States Patent
Schulte et al.

(10) Patent No.: US 8,653,157 B2
(45) Date of Patent: Feb. 18, 2014

(54) POLYURETHANE COMPOUND AND SHOE SOLES MADE THEREFROM

(75) Inventors: Dave Schulte, St. Louis, MO (US); Ulrich Holeschovsky, Pittsburgh, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 784 days.

(21) Appl. No.: 12/110,244

(22) Filed: Apr. 25, 2008

(65) Prior Publication Data

US 2008/0269371 A1 Oct. 30, 2008

Related U.S. Application Data

(60) Provisional application No. 60/914,374, filed on Apr. 27, 2007.

(51) Int. Cl.
*C08K 5/04* (2006.01)

(52) U.S. Cl.
USPC .............. 523/122; 524/590; 524/81; 524/275

(58) Field of Classification Search
USPC ........................................ 524/487
See application file for complete search history.

(56) References Cited

U.S. PATENT DOCUMENTS

| | | | |
|---|---|---|---|
| 3,753,933 A | | 8/1973 | Olstowski et al. |
| 4,021,379 A | * | 5/1977 | Chaya et al. ................ 526/107 |
| 4,053,076 A | * | 10/1977 | Vogel et al. ................ 215/12.2 |
| 4,345,058 A | * | 8/1982 | Dettling ........................ 528/48 |
| 4,757,095 A | * | 7/1988 | Galan et al. ................ 521/128 |
| 5,157,101 A | * | 10/1992 | Orr ............................. 528/74.5 |
| 5,250,579 A | | 10/1993 | Smits et al. |
| 5,260,343 A | * | 11/1993 | Harrison et al. ............. 521/51 |
| 5,746,812 A | * | 5/1998 | Muller et al. ................. 106/10 |
| 6,759,443 B2 | | 7/2004 | Brant et al. |
| 2002/0193459 A1 | * | 12/2002 | Haseyama et al. ........... 521/155 |
| 2004/0121162 A1 | * | 6/2004 | Yamaoka et al. .......... 428/425.8 |
| 2004/0214909 A1 | | 10/2004 | Brant et al. |

OTHER PUBLICATIONS

"Surface-Modified Polymer Particles: Performance Additives for Cast PU" Bauman (Nov. 2001).
"Terathane Innovative Polyurethane Intermediates" Invista Product Literature (2005).
"Mondur MA-2903" Bayer MaterialScience Product Literature (1999).
"Mondur PF" Bayer MaterialScience Product Literature (2003).
"Multranol 9111" Bayer MaterialScience Product Literature (1997).
"Arcol E-434" Bayer MaterialScience Product Literature (2003).
Invista Terethane PTMEG and 1,4 Butanediol Technical Information (2005).
PolyTHF Polyether Diol 650 Technical Data Sheet (1997).
PolyTHF Polyether Diol 1000 Technical Data Sheet (1997).

* cited by examiner

*Primary Examiner* — Doris Lee
(74) *Attorney, Agent, or Firm* — Robert S. Klemz

(57) ABSTRACT

A polyurethane compound is disclosed, comprising the reaction product of an isocyanate and one or more polyols including at least one polytetramethylene ether glycol and polyethylene wax. The latter two ingredients greatly enhance abrasion resistance of the compound, making the compound particularly suitable for use as an outsole of footwear for rugged use applications.

23 Claims, No Drawings

POLYURETHANE COMPOUND AND SHOE SOLES MADE THEREFROM

CLAIM OF PRIORITY

This application claims priority from U.S. Provisional Patent Application Ser. No. 60/914,374 filed on Apr. 27, 2007, which is incorporated by reference.

FIELD OF THE INVENTION

This invention concerns polyurethane compounds that have excellent abrasion resistant when molded into outsoles of shoes and boots.

BACKGROUND OF THE INVENTION

Ever since the work of Charles Goodyear and Charles Mackintosh to introduce vulcanized rubber to the market to replace leather, fabric, and other materials, footwear has benefited from many advances in the art. Water and abrasion resistance have made many synthetic polymeric materials preferred for outsoles of shoes and boots. People wearing such shoes and boots in inclement weather or other rugged conditions truly appreciate the protection and warmth of modern synthetic materials used in such articles of footwear.

Conventionally, the outsole is that portion of the shoe or boot that is in direct contact with the ground. The material of the outsole must be a very durable material, especially the heel portion which in material can be the same as or different from the material of the remainder of the outsole. Synthetic rubber emerged in the mid-$20^{th}$ Century as a suitable outsole material, especially for heels, and preferable for the entire outsole for footwear intended for use in industrial or outdoor conditions.

More recently, polyurethane has emerged as a desirable substitute for synthetic rubber for outsoles because of superior abrasion resistance in a material that has less density than rubber. One example of advances in the polyurethane outsole art is disclosed in U.S. Pat. No. 6,759,443 (Brant et al.) for a polyurethane foam composition. Preferred abrasion resistant additives include a combination of polyethylene wax with poly(tetrafluoroethylene) (PFTE) particles.

When polyurethanes find application in outsoles, they are typically based on polyester polyols because they provide better abrasion properties than polyether polyols. However, polyester outsoles tend to hydrolyze over time especially when stored for extended periods. For that reason among others, the U.S. military requires use of polyether-based polyurethanes in their mid and insole, i.e. specifically use of any polyester-based polyurethanes is not permitted. The somewhat lower properties of polyether-based polyurethane compared to polyester-based polyurethanes have prevented the use of polyurethane in outsoles in combat boots for the U.S military to date.

SUMMARY OF THE INVENTION

What the art still needs is a polyurethane compound that offers superior abrasion resistance.

What the art still needs is a polyether based outsole with superior abrasion resistance.

The present invention solves that problem by advantageously combining a polyurethane intermediate as an ingredient in a polyurethane compound with an organic wax yielding superior abrasion resistance.

One aspect of the invention is a polyurethane compound, comprising (a) the reaction product of (1) an isocyanate and (2) one or more isocyanate reactive compounds including at least one polytetramethylene ether glycol, and (b) an organic wax.

Another aspect of the invention is an outsole made from the polyurethane compound.

Another aspect of the invention is an article of footwear made from the polyurethane compound.

Another aspect of the invention is an abrasion resistant polyurethane outsole made with polyether polyols as opposed to polyester polyols.

EMBODIMENTS OF THE INVENTION

Polyurethane

As explained in Brant et al., polyurethane is a conventional polymer made by the reaction of a polyisocyanate component with an isocyanate reactive compound, that is a polyol component or other substance having hydrogens reactive to the polyisocyanate.

Reactive polyurethanes are typically two or more component systems with polymerization occurring in the presence of additives, catalysts, and the like. Thus, articles made from polyurethane rely on in situ polymerization of the polyurethane with all other ingredients also present at the time of molding of the article.

These other ingredients are of a type known by those skilled in the art to be used in sufficient quantity as catalysts to catalyze the polymerization reaction, as blowing agents to provide foaming, as surfactants to regulate morphology, and as chain extenders, fillers, pigments, antioxidants, and stabilizers.

Isocyanate Component

Organic polyisocyanates useful in the present invention contain aromatically bound isocyanate groups. Non-limiting examples include 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, 2,4 toluene diisocyanate, 2,6-toluene diisocyanate, mixtures of 2,4- and 2,6-toluene diisocyanate, hexahydrotoluene diisocyanate, 1,5-naphthalene diisocyanate, 1-methoxy-2,4-phenylene diisocyanate, 2,2-, 2,4- and 4,4'-biphenylmethane diisocyanate, methyl, diphenyl diisocyanate, 4,4'-biphenylene diisocyanate, 3,3'-dimethyl-4,4'-diphenylmethane diisocyanate, 3,3'-4,4'-diphenylmethane diisocyanate, and 3,3'-dimethyl-diphenylmethane-4,4'-diisocyanate, 2,2-, 2,4-, 4,4-, and polymer diphenylmethane diisocyanate and pre-polymers made thereof; the triisocyanates such as 4,4',4"-triphenylmethane triisocyanate, polymethylene polyphenylene polyisocyanate, and 2,4,6-toluene triisocyanate; and the tetraisocyanates such as 4,4-dimethyl-2,2'-5,5'-diphenylmethane tetraisocyanate.

Quasi-prepolymers may also be employed in the process of the subject invention. These quasi-prepolymers are prepared by reacting an excess of organic polyisocyanate or mixtures thereof with a minor amount of an active hydrogen-containing compound determined by the well-known Zerewitinoff Test, as described by Kohler in Journal of the American Chemical Society, 49, 3181 (1927). These compounds and their methods of preparation are well known in the art. The use of any one specific active hydrogen compound is not critical hereto; rather, any such compound can be employed herein. Generally, the quasi-prepolymers have a free isocyanate content of from 15 percent to 40 percent by weight.

Mixtures of polymeric diphenylmethane diisocyanate (polymeric-MDI) and carbodiimide or urethane-modified MDI are preferred. Most preferably, isocyanate-terminated (MDI) prepolymer, such as Mondur MA-2903 brand isocyanate from Bayer, and modified 4,4' diphenylmethane diisocyanate (mMDI) prepolymer, such as Mondur PF brand isocyanate also from Bayer, are used.

Isocyanate Reactive Components

Any suitable polyoxyalkylene polyether polyol may be used such as those resulting from the polymerization of a polyhydric alcohol and an alkylene oxide. Non-limiting examples of such alcohols include ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, or 1,2,6-hexanetriol. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures, epihalohydrins such as epichlorohydrin, as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols and copolymer glycols prepared from blends or sequential addition of two or more alkylene oxides. The polyoxyalkylene polyether polyols may be prepared by any known process, such as the process disclosed by Wurtz in 1859 and Encyclopedia of Chemical Technology, Vol. 7, pp. 257-262, published by Interscience Publishers, Inc. (1951) or in U.S. Pat. No. 1,922,459.

Of these many possibilities, a 4,000-molecular-weight polypropylene oxide-based diol specially modified with ethylene oxide marketed by Bayer using the brand Multranol 9111 is preferred, as is 4,800-molecular-weight polyoxypropylene triol specially modified with ethylene oxide also marketed by Bayer under the brand Arcol E-434. Also preferred is 1,4 butanediol and ethylene glycol in minor amounts, available from numerous sources.

The present invention departs from Brant et al. and others by teaching that when some poly tetramethylene ether glycol (PTMEG) is incorporated into the reacted polyurethane compounds, use of organic wax greatly improves the abrasion resistant without requiring any other abrasion resistant additives such as PTFE.

PTMEG is a linear diol in which the hydroxyl groups are separated by repeating tetramethylene ether groups. Commercially available sources of PTMEG include the Terathane brand polyether glycol product line from Invista of Wichita, Kans. Of the various grades of Terathane PTMEG, Terethane 650 is preferred.

In some cases, additional property improvements can be accomplished by using polyester polyols, either as a part of the isocyanate reactive component or as a part of the isocyanate pre-polymer. Non-limiting examples of polyester polyols include polyols from such polyesters as p-caprolactones, adipates, succinates, terephthalates, isophthalates, orthophthalates, and the like.

In some other cases, additional property improvements can be accomplished by using amines or amine terminated polyols, either as a part of the isocyanate reactive component or as a part of the isocyanate pre-polymer. Non limiting examples are diethyl toluene diamine and amine terminated polyols such as commercially available under the Jeffamine brand.

Other examples of useful polyols are disclosed in Brant et al.

Catalysts

Any suitable catalyst may be used including tertiary amines such as triethylenediamine, N-methylmorpholine, N-ethylmorpholine, diethylethanolamine, N-cocomorpholine, 1-methyl-4-dimethylaminoethylpiperazine, methoxypropyldimethylamine, N,N,N'-trimethylisopropyl propylenediamine, 3-diethylaminopropyldiethylamine, dimethylbenzylamine, and the like. Other suitable catalysts are, for example, dibutyltin dilaurate, dibutyltin d/acetate, stannous chloride, dibutyltin di-2-ethyl hexanoate, and stannous oxide. Presently preferred are catalysts commercial available from Air Products and Chemicals Co. and branded as DABCO catalysts, including DABCO S-25 strong gelation catalyst which is a mixture of 25% DABCO crystalline catalyst and 75% BDO catalyst and DABCO T-12 dibutyltin dilaurate catalyst. A good summary of suitable catalysts is provided in 'Dow Polyurethanes Flexible Foams' by Ron Herrington and Kathy Hock, $2^{nd}$ edition 1997, incorporated herein by reference.

Abrasion Resistance Wax

Polyethylene wax is useful in the present invention to provide a combination of lubricity and abrasion resistance. A variety of polyethylene waxes are commercially available, some alone and others mixed with other abrasion resistance agents such as poly(tetrafluoroethylene) (PTFE) particles. For example, Brant et al. teach a preference for a substantially homogeneous blend of polyethylene and PTFE commercially available as Polyfluo® brand mixture from Micro Powders, Inc. of Tarrytown, N.Y.

The present invention uses a micronized polyethylene wax, also from Micro Powders, Inc., marketed under the brand MPP-230F, which is advertised as providing both abrasion resistance and slip resistance in liquid or paste printing inks, paints, and coatings. The effect of this micronized polyethylene wax is greatly enhanced when incorporated into a polyurethane that was made using at least some PTMEG.

Other Optional Additives

A surface active agent is generally used for production of integral skin polyurethane foams. Surfactants which may be used are those which aid in homogenizing or emulsifying the initial materials and may also be suitable for regulating cell structure. Typical examples are foam stabilizers such as siloxane oxyalkylene heterol polymers and other organic polysiloxanes, oxyethylated alkyl phenol, oxyethylated fatty alcohols, fluoroaliphatic polymeric esters, paraffin oils, castor oil ester, phthalic acid esters, ricindolic acid ester, and Turkey red oil, as well as cell regulators such as paraffins.

Chain extending agents employed in the present invention include those having two functional groups bearing active hydrogen atoms. A preferred group of chain extending agents includes ethylene glycol, diethylene glycol, propylene glycol, or 1,4-butanediol.

A polyurethane compound of the present invention can include conventional plastics additives in an amount that is sufficient to obtain a desired processing or performance property for the compound. The amount should not be wasteful of the additive nor detrimental to the processing or performance of the compound. Those skilled in the art of polyurethane formulation technology, without undue experimentation but with reference to such treatises as Saunders and Frisch, *Polyurethane Chemistry and Technology* (Wiley Interscience, 1962 et seq.), can select from many different types of additives for inclusion into the compounds of the present invention.

Non-limiting examples of such optional additives include, in addition to those already described, adhesion promoters; biocides (antibacterials, fungicides, and mildewcides), anti-fogging agents; anti-static agents; bonding, blowing and foaming agents; dispersants; fillers and extenders; fire and flame retardants and smoke suppresants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

As explained in Brandt et al., blowing agents are often used to impart a foamed morphology to the polyurethane compound. Non-limiting examples of blowing agents useful in polyurethane chemistry are HFC 134a, HFC 245fa, water, or a combination of them in minor amounts.

Table 1 shows the acceptable, desirable, and preferred amounts of the ingredients of the polyurethane compound of the present invention.

TABLE 1

(Weight Percent)

| Ingredient | Acceptable | Desirable | Preferred |
|---|---|---|---|
| Isocyanate | 10-50 | 20-45 | 25-40 |
| Polyol | 10-90 | 10-50 | 40-60 |
| Catalyst | 0.001-3.0 | 0.1-2.5 | 0.5-2.0 |
| Abrasion Resistant Wax | 1-15 | 3-12 | 5-10 |
| Abrasion Resistant Polyol | 10-90 | 10-50 | 10-20 |
| Optional Blowing Agent | 0-10 | 0-5 | 0-3 |
| Other Optional Additives | 0-10 | 0-5 | 0-3 |

Processing

The preparation of compounds of the present invention is uncomplicated. Typically, all the ingredients other than the isocyanate are blended in a batch operation. This blend is then mixed with isocyanate, typically in a two component set-up through commercially available dispensing equipment. In some cases there may be more that two streams mixed, for example a pigment may be advantageously used in a third stream thus allowing quick color changes of the molded product.

Molding techniques of polyurethane compounds are well known to those skilled in the art, especially using such learned treatises as Saunders and Frisch, *Polyurethane Chemistry and Technology* (Part II) and Oerkel, *Polyurethane Handbook*, Second Edition. Without undue experimentation but with such references one can make articles of any conceivable shape and appearance using compounds of the present invention.

Molding equipment is well known in the art to be particularly designed to make outsoles from in situ polymerization of polyurethane compounds, in the presence of additives such as the abrasion resistant agents described above. These machines, such as those marketed by Klöckner Desma of Achim, Germany, employ robotic techniques and add the ability to have injection molding of shoe outsoles and their attachment to the midsole of the shoe. These machines can have multiple stations in the form of a carousel for quite efficient production of shoes and boots. Other manufacturers of equipment for footwear direct molding construction include Gusby, C.I.C. Ralphs Ltd. of West Midlands, U.K., The Main Group of Padua, Italy, Krauss Maffei of Munich, Germany.

USEFULNESS OF THE INVENTION

Abrasion resistance (NBS Abrasion using ASTM method D1630) has been found to be almost 7 times better when using a combination of abrasion resistance wax and PTMEG. Table 4 shows a comparison of the average of NBS Abrasion of Examples 1-2 and Comparative Examples A-B, which do not include both abrasion resistance wax and PTMEG. Example B shows that use of PTMEG alone does not yield an improvement.

Abrasion resistance (Taber Abrasion using ASTM method D3489) has been found to be between 80 and 95% better when comparing the Taber Abrasion of Examples 1-2 and Comparative Example A.

With such superior abrasion resistance, polyurethane compounds of the present invention become very useful for outsoles of footwear, especially industrial or outdoor footwear where the stresses placed on the outsoles are greatest. Employing a Klöckner Desma automated footwear manufacturing machine, one skilled in the art using polyurethane compounds of the present invention can make excellent shoes and boots by molding in place the outsoles having the abrasion resistance described above. This invention also allows to eliminate the use of polyesters as part of the polyurethane compound If so desired.

The invention is not limited to the above embodiments. The examples explain in detail how the comparative abrasion resistance was obtained.

Because of the superior abrasion resistance of compounds of the present invention, it is now possible to lower the density of the outsole by using blowing agents commonly used in the polyurethane industry, such as water, HFC 134a, HFC 245fa, and the like. For example, one could use blowing agent to reduce the density of an outsole by 20% and still exceed the abrasion resistance of an outsole made from rubber. Use of a blowing agent, especially not only saves on the cost of the compound mass no longer needed but also reduction of mass of the outsole on a shoe being worn by its user. A less heavy shoe with comparable or superior abrasion resistance increases comfort without sacrificing durability.

EXAMPLES

Table 2 shows the sources of the ingredients used to make Examples 1 and 2 and Comparative Examples A and B.

TABLE 2

Source of Ingredients

| Ingredient Name | Purpose | Brand Name | Generic Name | Commercial Source |
|---|---|---|---|---|
| Multranol 9111 | Polyol | Multranol | Polyether Polyol | Bayer |
| Arcol E434 | Polyol | Arcol | Polyether Polyol | Bayer |
| Dabco S-25 | Catalyst | Dabco | DABCO Crystalline + BDO | Air Products |
| 1,4 butanediol | Polyol | | BDO | Various |
| Polyethylene MPP-230F | Increase Abrasion resistance | | Polyethylene wax | Micro Powders Inc. |

Table 3 shows the sources of the ingredients used to make Examples 1 and 2 and Comparative Examples A and B.

TABLE 2-continued

Source of Ingredients

| Ingredient Name | Purpose | Brand Name | Generic Name | Commercial Source |
|---|---|---|---|---|
| Terathane 650 | Polyol-Increase Abrasion resistance | Terathane | PTMEG-polyether polyol | Invista |
| Tegostab B8939 | Surfactant | Tegostab | Silicone | Degussa |
| Dabco T-12 | Catalyst | Dabco | DBTDL | Air Products |
| Ethylene Glycol | Polyol | | EG | Various |
| Mondur MA-2903 | Isocyanate | Mondur | Isocyanate | Bayer |
| Mondur PF | Isocyanate | Mondur | Isocyanate | Bayer |

TABLE 3

Weight Percent

| Ingredients | Example 1 | Example 2 | Comparative Example A | Comparative Example B |
|---|---|---|---|---|
| Multranol 9111 | 39.69% | 35.31% | 59.65% | 41.88% |
| Arcol E434 | 7.61% | 6.77% | 9.36% | 8.04% |
| Dabco S-25 | 1.11% | 0.98% | 1.20% | 0.85% |
| Butanediol | 2.77% | 3.08% | 3.84.% | 3.47% |
| Polyethylene MPP-230F | 6.92% | 6.15% | | |
| Tegostab B8939 | | | 0.37% | |
| Terathane 650 | 12.45% | 11.08% | | 13.4% |
| Dabco T-12 | 0.03% | 0.02% | 0.01% | 0.01% |
| Ethylene glycol | 0.35% | 0.31% | 0.49% | |
| Mondur PF | 29.08% | | 26.29% | |
| Mondur MA-2903 | | 36.31% | | 33.2% |
| Total | 100.00% | 100.00% | 100.00% | 100.00% |

Comparative Examples A and B were prepared manually. The polyols and all the additives shown in Table 3 with the exception of the isocyanate were blended with a Hamilton Beach lab mixer to uniformity. The blends continued to be mixed under vacuum to degas. Finally, the blends so prepared were hand mixed with the Isocyanate with a spatula and poured into an open mold, approximately 6×6×0.25 inches. The mold was then placed in an oven and cured overnight at 150° F. The plaques were removed from the mold and left at room temperature for several days before undergoing testing.

The polyol and all the additives except for the isocyanate and the wax for Examples 1 and 2 were mixed in a Cowels Dissolver mixer set at low speed. The polyethylene wax was then added to the polyol blend and dispersed at high speed, keeping the temperature low enough to prevent melting of the polyethylene wax. The blends were continued to be mixed under vacuum to de-gas the blend. The resulting polyol blends and the corresponding isocyanates were processed through a Kloeckner DESMA 12 Station Carousel Injection Molding Machine to form the reacted polyurethane in closed molds. The pieces were de-molded after 5-10 minutes at 120° F. and left at room temperature for several days before testing. The reacted polyurethane was in the form of shoe outsoles and plaques suitable for testing.

Table 4 shows the test results for Examples 1-2 and Comparative Examples A-B including the abrasion resistance improvements explained above.

TABLE 4

| Properties | ASTM Method | 1 | 2 | A | B |
|---|---|---|---|---|---|
| NBS Abrasion | D1630 | 999 | 910 | 125 | 115 |
| Taber Abrasion | D3489 | 2 mg loss | 5 mg loss | 26 mg loss | Not measured |
| Hardness Shore A | D2240 | 69A | 69A | 64A | 60A |
| Stitch Tear (Dry) | D4786 | 288 | 313 | 72 | 61 |
| Stitch Tear (Fuel B) | D4786 | 201 | 250 | 42 | 67 |
| Die C Tear Strength | D624 | 212 | 237 | 273 | 215 |
| Ross Flex Oil #3 | D1052 | 0%/100 K | 0%/100 K | 0%/100 K | 0%/100 K |
| Volume Swell, Fuel B | D471 | 17.5% (24 hrs) 23.2% (46 hrs) | 24.5% (24 hrs) 31.1% (46 hrs) | 61% (24 hrs) | 33% (24 hrs) |
| Non-Marking | Satra MTM-223 | Pass | Pass | Pass | Pass |
| Tensile | D412 | 1728 | 2013 | 995 | 1750 |
| Elongation | D412 | 690 | 840% | 618% | 1000 |
| Cold Flex (@−23° C.) | D1052 | 500% | 0% @100 K (@−28.9° C.) | 0% @100 K (@−28.9° C.) | Not measured |

Table 5 shows how the properties of Examples 1 and 2 compare with two very stringent specifications for outsole performance.

TABLE 5

| Properties | Test Method | 1 | 2 | Specification Rubber Outsole CRFD/PD 06-26 Intermediate Cold Wet Boot | Specification Rubber Outsole Man's Combat Temp Weather Air Force (Provisional) |
|---|---|---|---|---|---|
| NBS Abrasion | D1630 | 999 | 910 | 120 minimum | 150 minimum |
| Hardness Shore A | D2240 | 69A | 69A | 57-67A | 70-80A |
| Stitch Tear (Dry) | D4786 | 288 | 313 | 300 minimum | 180 minimum |
| Stitch Tear (Fuel B) | D4786 | 201 | 250 | 50 minimum | 50 minimum |
| Die C Tear Strength | D624 | 212 | 237 | 250 minimum | 300 minimum |
| Ross Flex Oil #3 | D1052 | 0%/100 K | 0%/100 K | 250% max @50 K | 250% max @50 K |
| Volume Swell, Fuel B | D471 | 23.2% (46 hrs) | 31.1% (46 hrs) | 70% max (46 hrs) | 30% max (46 hrs) |
| Non-Marking | Satra MTM-223 | Pass | Pass | Pass | Pass |
| Tensile | D412 | 1728 | 2013 | 2100 minimum | 2100 minimum |
| Elongation | D412 | 690% | 840% | 400% minimum | 400% minimum |
| Cold Flex (@-23° C.) | D1052 | 500% @100 K (@-28.9° C.) | 0% @100 K (@-28.9° C.) | 500% @ 7500 flexes | 500% @ 7500 flexes |

Nearly every specification of these two difficult standards is met or exceeded by both Examples 1 and 2 of the present invention. Please note that the specifications shown in Table 5 apply to rubber. Currently, there is no U.S. military specification for urethane outsoles. If the military were to specify the use of a urethane outsole, then the requirement for NSB abrasion could be set much higher than for rubber. Unexpectedly, the NSB abrasion could be increased from 120 or 150 to as high as 900, beyond anything that could be served by rubber.

Examples 1 and 2 showed the unexpected benefit to abrasion resistance specifications for military grade footwear. Examples 1 and 2 were not intended to satisfy the complete list of military specifications for a rubber outsole. Any person skilled in the art of urethane formulations will understand that the properties such as Die Tear C and Tensile Strength can be improved upon by modifying the formulation through selection of appropriate polyols and other additives known to the art.

Using this invention, it has been demonstrated that abrasion resistance can be increased at least 6-fold while substantially meeting the current rubber specifications identified in Table 6. In addition to excellent abrasion resistance values, flex properties are excellent, as seen in Table 5. Particularly, Example 2 had outstanding Cold Flex properties, even as it was being tested 6° C. below the required temperature. At 500% cut growth, the entire 2.54 cm wide sample would be broken. So 0% cut growth at 100k flexes compared to a requirement of 500% at only 7500 cycles represents a truly unexpected test result.

It is important to point out that the outstanding physical properties shown in Table 5 were accomplished using urethane formulations based entirely on polyether polyols. Because no polyesters are used, outsoles made according to the present invention can not hydrolyze. Therefore, these outsoles meet a requirement by the U.S military to not use any polyesters in materials used to make combat footwear for the military.

In cases where no requirement to exclusively use polyether based polyurethane exists, addition of polyesters may further improve physical properties. For example, outsoles of industrial safety boots are often made of polyester-based polyurethanes. Any person skilled in the art will understand that the findings presented here will also apply to outsoles that use polyester as long some PTMEG and wax are employed.

The invention is not limited to the above embodiments. The claims follow.

What is claimed is:

1. A polyurethane compound, comprising:
   (a) the reaction product of
      (1) an isocyanate and
      (2) one or more isocyanate reactive compounds including at least one polytetramethylene ether glycol and
   (b) an organic wax,
   wherein component (b) is a polyethylene wax,
   wherein the compound is essentially free of polytetrafluoroethylene,
   wherein the isocyanate is selected from the group consisting of 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, 2,4 toluene diisocyanate, 2,6-toluene diisocyanate, mixtures of 2,4- and 2,6-toluene diisocyanate, hexahydrotoluene diisocyanate, 1,5-naphthalene diisocyanate, 1-methoxy-2,4-phenylene diisocyanate, 2,2-, 2,4-, and 4,4'-biphenylmethane diisocyanate, methyl, diphenyl diisocyanate, 4,4'-biphenylene diisocyanate, 3,3'-dimethyl-4,4'-diphenylmethane diisocyanate, 3,3'-4,4'-diphenylmethane diisocyanate, and 3,3'-dimethyldiphenylmethane-4,4'-diisocyanate; 4,4',4"-triphenylmethane triisocyanate, polymethylene polyphenylene polyisocyanate, 2,4,6-toluene triisocyanate; 4,4-dimethyl-2,2'-5,5'-diphenylmethane tetraisocyanate, isocyanate-terminated (MDI) prepolymer, modified 4,4' diphenylmethane diisocyanate (mMDI) prepolymer, 2,2-, 2,4-, and 4,4-diphenylmethane diisocyanate and pre-polymers made thereof and combinations thereof, and
   wherein the compound when molded has a NBS abrasion according to ASTM method D1630 of at least 200.

2. The compound of claim 1, wherein the isocyanate prepolymer has a free isocyanate content of from 15 percent to 40 percent by weight of the pre-polymer and wherein the compound when molded has a NBS abrasion according to ASTM method D1630 of at least 400.

3. The compound of claim 1, wherein the isocyanate is isocyanate-terminated (MDI) prepolymer or modified 4,4' diphenylmethane diisocyanate (mMDI) prepolymer, or combinations thereof.

4. The compound of claim 1, wherein the isocyanate is 2,2-diphenylmethane diisocyanate, or 2,4-diphenylmethane diisocyanate, or 4,4-diphenylmethane diisocyanate, or prepolymers made thereof.

5. The compound of claim 1, wherein component (2) contains polyester polyol(s).

6. The compound of claim 1, further comprising an additive selected from the group consisting of adhesion promoters; biocides (antibacterials, fungicides, and mildewcides), anti-fogging agents; anti-static agents; bonding, blowing and foaming agents; dispersants; fillers and extenders; fire and flame retardants and smoke suppresants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

7. The compound of claim 1, wherein component (2) include one or more amine(s).

8. The compound of claim 7, wherein the amine is diethyl toluene diamine.

9. The compound of claim 1 wherein the polyethylene wax is a micronized polyethylene wax.

10. The compound of claim 1, further comprising surfactant(s) or chain extending agent(s).

11. The compound of claim 1, further comprising a catalyst for reaction to polymerize the polyurethane compound in the presence of the polytetramethylene ether glycol and the polyethylene wax, wherein the compound when molded has a NBS abrasion according to ASTM method D1630 of at least 400.

12. The compound of claim 11, wherein the catalyst is a tertiary amine.

13. The compound of claim 11, wherein the catalyst is selected from the group consisting of triethylenediamine, N-methylmorpholine, N-ethylmorpholine, diethylethanolamine, N-cocomorpholine, 1-methyl-4-dimethylaminoethylpiperazine, methoxypropyldimethylamine, N,N,N'-trimethylisopropyl propylenediamine, 3-diethylaminopropyldiethylamine, dimethylbenzylamine, dibutyltin dilaurate, dibutyltin diacetate, stannous chloride, dibutyltin di-2-ethyl hexanoate, stannous oxide, and combinations thereof.

14. The compound of claim 1, wherein component (2) includes a polyoxyalkylene polyether polyol resulting from the reaction of a polyhydric alcohol and an alkylene oxide and wherein the compound when molded has a NBS abrasion according to ASTM method D1630 of at least 900.

15. The compound of claim 14, wherein the polyhydric alcohol is selected from the group consisting of ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, and combinations thereof.

16. The compound of claim 15, wherein the alkylene oxide is selected from the group consisting of ethylene oxide, propylene oxide, butylene oxide, amylene oxide, and mixtures of these oxides.

17. The compound of claim 16, wherein the polyol component is selected from the group consisting of polypropylene oxide-based diol with ethylene oxide, polyoxy-propylene triol modified with ethylene oxide, 1,4 butanediol, ethylene glycol, and combinations thereof.

18. The compound of claim 1, wherein the compound is polymerized during molding into the form of an outsole of footwear.

19. An outsole made from the compound of claim 18.

20. An article of footwear of claim 19, wherein the outsole has a NBS abrasion according to ASTM method D1630 of at least 200.

21. An article of footwear of claim 19, wherein the outsole has a NBS abrasion according to ASTM method D1630 of at least 400.

22. An article of footwear of claim 19, wherein the outsole has a NBS abrasion according to ASTM method D1630 of at least 900.

23. An article of footwear made from the outsole of claim 19.

* * * * *